Dec. 17, 1935.   K. KLINGSPORN   2,024,737
PIEZO ELECTRIC CELL
Filed Aug. 8, 1933   2 Sheets-Sheet 1

Inventor:
Kurt Klingsporn

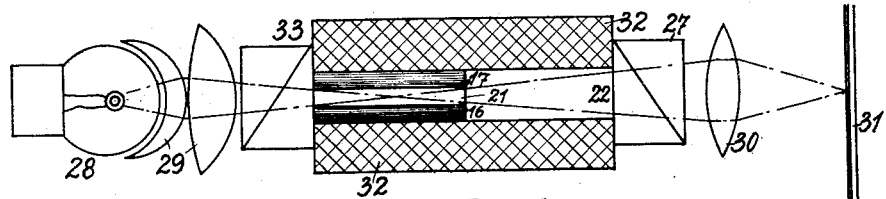
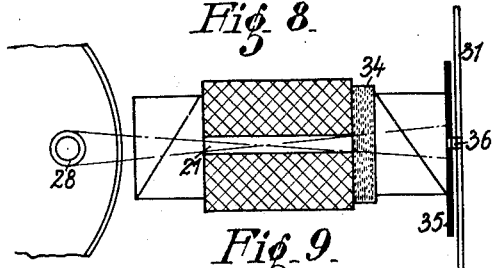
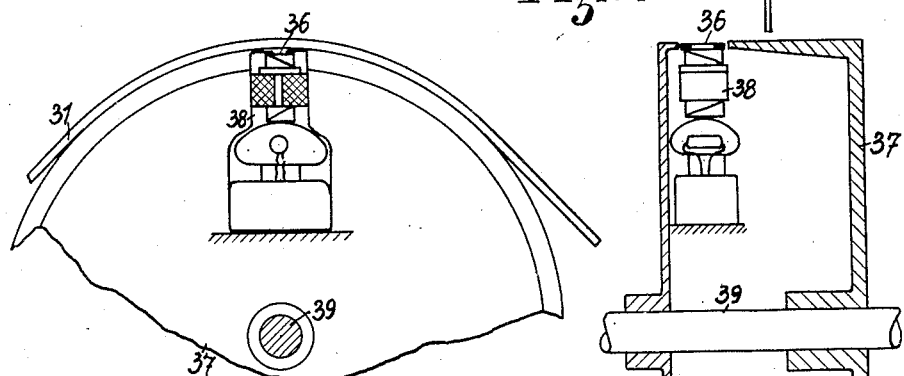
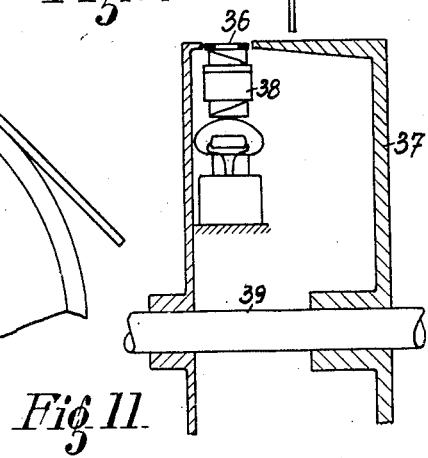
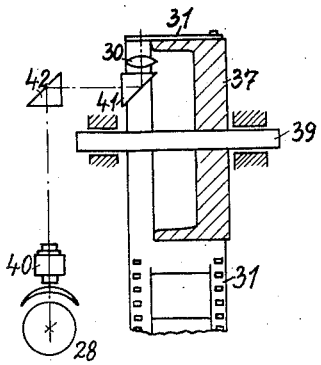
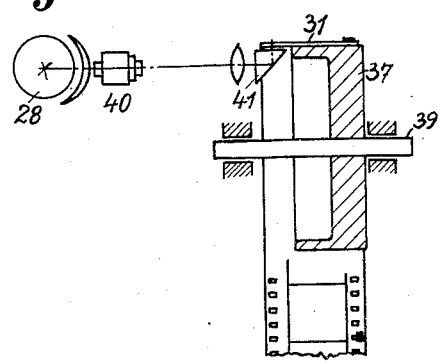

Patented Dec. 17, 1935

2,024,737

UNITED STATES PATENT OFFICE 2,024,737

PIEZO-ELECTRIC CELL

Kurt Klingsporn, Berlin, Germany, assignor to Radioaktiengesellschaft D. S. Loewe, Berlin-Steglitz, Germany, a company of Germany Application August 8, 1933, Serial No. 684,291
In Germany August 12, 1932

9 Claims. (Cl. 88—61)

The subject matter of the invention is a piezo-electric cell, in which the variation in the double refraction dependent on the strength of field applied is made use of to control intensities of light. Arrangements of this kind are known in the recordal of sound films, and for television and for image transmission purposes.

In order to convert fluctuations in potential into proportionate fluctuations in the intensity of light, there is employed usually, for sound film and image-transmission purposes, the Kerr cell. Kerr discovered the phenomenon of the electrical double refractory within fluids. He found that the intensity of the electro-optical efficiency, i. e. the difference of the retardation of the ordinary and the extraordinary light ray, relative to the unit of thickness of the dielectricum is a quadratic function of the potential. Principally a Kerr cell consists of a glass vessel being filled with the double refractory medium, for example nitro-benzole and having two electrodes, to which the potential is applied. A light-ray the intensity of which is to be controlled by the fluctuations of potential, is caused to pass through two Nicol elements in crossways position, between which the glass vessel is interposed.

In order to operate on the straight part of the curve of the Kerr cell, a bias is necessary of about twice the amount of the control potential. The present invention is intended to considerably simplify and improve this arrangement.

In the following a brief description of the method and the arrangement according to the invention is given:

As double refractive medium there is employed a piezo-electric crystal, the double refraction of which varies in the electrical field. This variation is of a linear kind dependent on the potential applied. Since a very considerable strength of field is required for this variation, it would be necessary to employ a very high control potential. For this reason the crystal is divided in the form of plates, which naturally require to be located according to the definite axes of symmetry. The cross-section of the light current may accordingly be increased as desired. Beyond this the absorption in quartz, which is the most suitable material, is practically not existent.

The intensity of the light passing through in the usual arrangement between two Nicol elements is a function of the phase shift between the ordinary and the extraordinary ray of light in the double refractive medium. In order to operate on the straight part of the curve a certain shifting of the phase is already required in the zero point. This in the present case may be accomplished in very simple fashion by corresponding dimensioning of the crystal, so that an electric bias is wholly unnecessary. By reason of a certain wedge arrangement it may be accomplished that the initial phase shift may be varied as desired, assuming this should be necessary.

If the crystal employed is a quartz crystal, this arrangement provides the possibility of precise measurement. The ends of the crystal are ground off in correspondingly oblique fashion, and interference strips are then obtained, which shift exactly in proportion to the strength of the field. For compensating the fluctuations in temperature there is employed in the same arrangement a similar crystal, which is twisted in corresponding fashion in relation to the first crystal. The original phase shift is accordingly also compensated, so that it is possible to operate with the interference strip of the first order.

In the event of the frequency dependency playing any part when employing an arrangement of this nature, it is a simple matter, by subdividing the crystal plates, to dispose the natural frequencies in such a manner that the frequency curve may be adapted to any desired purpose.

It will frequently be desirable to unite the entire arrangement of the electrical light control to form one single body. This body then merely requires to be interposed in the path of light between the lamp and the film. A bias is not required, and in the same manner all difficulties arising owing to impurities in the nitro-benzole are also eliminated. By suitable dimensioning it may be accomplished that the operating potential agrees with that usually employed. Existing apparatus may also be readily used.

According to the invention, the possibilities of employing the cell for the stated purposes, i. e. in the recording of sound films, and for television and for image transmission purposes, and also as a measuring instrument, more particularly for high potentials, are considerably enhanced by the fact that in addition to the controlled crystal a second double-refractory medium is disposed in the direction of the rays of light, which medium, in relation to the first, is turned in such fashion as regards the optical polarization axes as to provide compensation of the double refraction of the first crystal.

In this manner it is accomplished that slight variations in the double refraction of one or both of the two crystals make themselves noticeable in the form of considerable variations in the intensity of the light passing through, so that great variations in light may be obtained with relatively low potentials or changes in the potential.

In order to make the compensation as complete as possible, it is desirable to produce the second compensation crystal from the same piece of material from which the first crystal was made, or at least from a crystal which is of a similar kind insofar as temperature, refraction and pressure coefficients are the same, so that disturbances arising from fluctuations in the external influence are also compensated.

To obtain maximum strength of the electrical field, it is desirable to divide at least the controlled crystal, or also both crystals, more particularly if both crystals are controlled, into narrow plates, and to allow the electrical field to be produced by conductive foils situated between the plates. Additional subdivision of the plates is possible by dividing these into bodies of such small size, that their natural frequencies are disposed outside of the working range when the cell, for example, is employed for the transmission of sound oscillations.

Amplification of the effect is obtained by the fact that, when electrical fields, which are subjected to the same fluctuations in potential, are applied to the two crystals, the effect of the double refraction is accordingly added together. Adjustment of the degree of compensation is desirable for the reason that it would be an extremely difficult matter to dimension the crystals so exactly in relation to each other—in which connection it is a matter of part-lengths of light waves—that the same would fully compensate each other, or allow precedence by the ordinary ray as compared with the extraordinary ray. Adjustment is rendered possible by the fact, that the crystals thrust against each other in wedge-like arrangement, so that by relative displacement of the two crystals a variation is obtained in both as regards the ratio in the path of the light.

In order to obtain a compact form of aggregate which is readily capable of use in practice, it is desirable to assemble the pair of crystals together with the Nicols element to form a single fixable optical system, which may then be disposed in common in the desired arrangement in the path of the light.

In the known arrangements in which quartz crystals are employed for controlling light (for example, German Patent 543,917, French Patent 662,437) polarized light has been allowed to pass through the crystal in the direction of the optical axis, whereby for attaining a perceptible variation in the intensity of the light large distances in the quartz for twisting the plane of polarization and large potentials of the applied electrical field are required. This is due to the fact that, generally speaking, it is not the double refraction itself, but merely the twisting of the plane of polarization upon the passage of the light through the quartz and the variation in the intensity of the light owing to this twisting under the influence of the electrical field which may be made use of. The German Patent 543,917 states, for example, that the wave length of a mercury arc (5461 Å. and 4358 Å.) the twisting of the plane of polarization per mm. distance in the quartz is approximately 25 or 42°, and that, therefore, with a distance of approximately 1 cm. a difference in the rotations of the two amounting to approximately 180° is obtained.

According to the invention, it is, in comparison with the known art, exactly the actual effect of the double refraction which is utilized for controlling the light by the fact that the ray of light passes through the electrically controlled crystal in a direction vertical to the optical axis and vertical to one of the electrical axes, with which the direction of the electrical field coincides, and that the faces of the crystal traversed by the light are parallel to the plane determined by the direction of this electrical and the optical axis. According now to the invention, the phase shift thus occurring between the ordinary and the extraordinary ray of light is compensated by the arrangement of the compensation crystal, which crystal, as regards the electrical and optical axes, is rotated to the extent of 90° in relation to the controlled crystal, taking the direction of the passage of the light axis of rotation.

Upon passage of the light in the direction of the optical axis it is known per se to compensate the rotational dispersion occurring by means of a second, after-connected quartz crystal. In contradistinction thereto it is not in the application a matter of compensating by means of the second crystal primarily the dispersion, but the phase shift between the ordinary and the extraordinary ray of light.

The difference disclosed by the invention in face of the known methods will be most apparent when considering the optical conditions in the case of monochromatic light. If in the case of the known arrangement monochromatic light were allowed to pass through in the direction of the optical axis, dispersion would not occur at all. If on the other hand monochromatic light is allowed to pass through a crystal in the arrangement according to the invention, and the compensation crystal is omitted, there should take place theoretically, dependent on the distance traversed by the light within the quartz, an extinguishing or brightening of the field of view behind the analyzer, in accordance with the fact as to whether the ordinary and extraordinary rays emerging just expunge or amplify each other. From a practical point of view, however, owing to the numerous expunging and brightening effects during the passage of the light through the quartz (approximately 300 times per centimetre in the case of sodium light), a flattening effect takes place, i. e., the brightening and expunging effects do not result in the maximum values, such as are present in connection with interferences of low order, but approach more and more a constant median value, wh'ch does also not vary, or is not avoided, by the effect of the electrical fields. Now, however, by the provision of the compensating crystal the phase shift caused by the first crystal is again overcome, so that with equal distances of light within the two crystals the light upon emerging from the second crystal oscillates in exactly the same fashion as when entering the first crystal. If in place of monochromatic light composed white light is employed, dispersions of the single wave lengths occurring as a subsidiary effect w ll also be counterbalanced.

If now a potential is applied to the controlled crystal, there results in this fashion a variation in the rate of propagation of the extraordinary ray in this crystal, and accordingly a variation in the phase shift. When the second compensating crystal is provided this causes a variation in the intensity of the light behind the analyzer. If the compensating crystal were omitted, a variation would not take place, or would not be perceptible;

the constant average intensity value above referred to would be maintained.

When making use of the actual effect of the double refraction a relatively small strength of field certainly results in merely a small variation in the phase shift, taken in relation to an interference, which, however, in view of the large number of interferences, leads despite its small value to a phase shift of one-half wave length, and accordingly to a complete change-over from light to dark, as the shift values of the phase are added together in the large number of interferences. In consequence the arrangement according to the invention is considerably (approximately 100 times) more sensitive than the known arrangements, in which the light is conducted through the crystal in the direction of the optical axis. By reason of the compensating crystal there are moreover also compensated the external influences of temperature, pressure and other fluctuations, which otherwise would produce an incorrect effect rendering the function wholly impossible, because even the smallest variations in the distance traversed within the quartz or mechanical strains of the order of a fraction of a wave length might exert a greater influence on the emerging ray of light than the controlling fluctuations of the electrical field.

In order to ensure compensation which is as complete as possible without difficult adjustment, it is desirable to cut both crystals from the one piece of material, or at least to ensure that the properties of the two are equal as regards refraction coefficient, temperature coefficient, longitudinal expansion and the like.

In view of the above the necessity arises for the possibility of varying the extent of the path of light and more particularly the ratio between the distances traversed by the light in the two crystals, in order to be able to adjust a strength of light situated at the desired part of the characteristic in respect of a certain zero position of the strength of field, about which strength of light the intensity varies upon fluctuation in the strength of the field. The adjustment may be performed either by wedge-like divisioning of one of the crystals and parallel displacement of the parts in relation to each other, or also by the fact that between the crystal axes and the path of light a rotation may take place in such fashion that the angle between the two is variable, if only to a slight extent. Also in this manner there is obtained a variation in the distance and in the phase shift within the crystals, which permits of adjustment with respect to certain intensity of the emerging ray.

In order to avoid a reflex action, it is desirable to make the side faces of the crystal cell, which are situated parallel to the direction of the light, opaque or to blacken the same. The connection of the small crystal pieces, which form the cells, with each other or with the support by means of cement or the like also causes possibilities of disturbance, which are avoided according to the invention by the fact that these pieces are held together and on the support by a constant pressure.

In order to dispense with excessive potentials, or potential variations of the electrical field, the controlled crystal, as already set forth in the above, must be employed in the form of narrow leaves, through which the light passes longitudinally. Since on the other hand it is impossible from a practical standpoint to transmit completely parallel rays of light from a source, the light channel—this is the capacity of the small leaves—is accompanied by a loss of light, which is proportional to the path of light in the crystal and in inverse proportion to the thickness of the crystal. If now only one crystal is controlled, and the compensation crystal is not controlled, there is no absolute necessity in connection with the latter to make the same narrow. The loss of light, therefore, may be decreased by furnishing the compensation crystal connected after the controlled crystal with a greater thickness than the latter, whereby the thickness thereof is preferably selected in such fashion that the same at least allows fully the passage of the ray passing through the controlled crystal and diverging to the greatest extent.

The total length of the path of light through the crystals may be decreased by employing as compensation crystal one having a greater double refractory effect, for example a lime-spar crystal, in which then the length of the path of light may be very much less than in the controlled quartz crystal. Certainly in this case it will be necessary to determine the dimensions exactly beforehand by tests or calculations, or to provide the possibility of exact adjustment.

When adopting the rule according to the invention it may be possible to make the total electrically controlled aggregate, which comprises the Nicol elements and the quartz crystals, so small that no collecting lens or lens reproducing the light source requires to be interposed in the passage of the rays from the source of light up to the point to be exposed, for example the film acting as sound support, or that even a greater yield is obtainable from the source of light than by the provision of lenses, with consideration to the requisite thickness and intermediate spacing. In this case the quartz crystal itself may act as gap if the same is less than 0.25 mm. in thickness or possesses even the preferable thickness of approximately $20\mu$. On the other hand a screening gap may be provided immediately in front of the film, in order to render halo effects and divergences within the second Nicol element ineffective.

The physical basis of the invention and its technical performance are described in detail in conjunction with the accompanying drawings, which show exemplary embodiments.

Fig. 1 shows an assembled aggregate with division of the crystals into plates,

Fig. 2 the sub-divisioning of the single plates, and

Fig. 3 the wedge-shaped crystals in displaced arrangement.

Fig. 8 illustrates the total arrangement of the optical aggregate.

Fig. 9 shows an arrangement without the interposition of lenses.

Figs. 10 and 11 illustrate in cross-section and longitudinal section one possible method of fitting the arrangement according to Fig. 9.

Figs. 12 and 13 show a possible method of fitting, with the use of lens systems.

Figure 1:
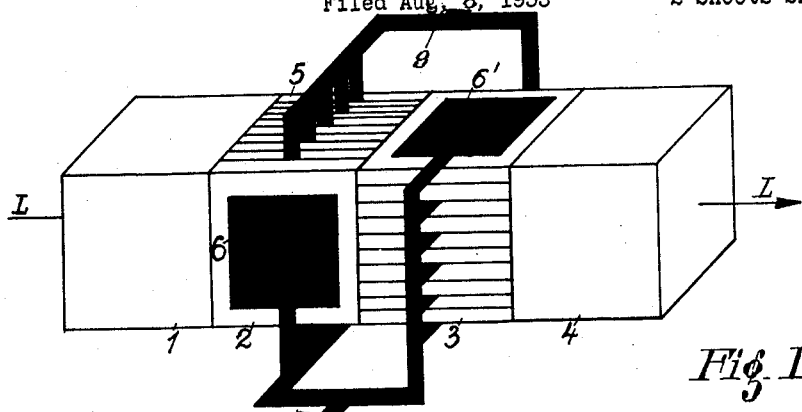

According to Fig. 1, the ray of light L to be controlled, indicated by the arrow, first passes through the Nicol element 1, which acts as polarizer, to the first controlled crystal 2, which is composed of plates 5 with intermediately disposed metal foils 6, which are connected alternately with the potential leads 7 and 8. In similar fashion the compensation crystal 3 is divided into plates, and the intermediately disposed foils 6' are connected with the conductors 7 and 8. The Nicol element 4 is connected in the capacity of analyzer after the crystals 2 and 3.

Figure 2:
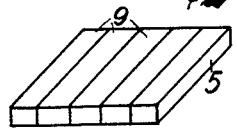

Fig. 2 shows the manner in which one of the plates 5 is again divided by transverse divisioning into single members 9, the natural frequencies of which are much higher than that of the plate 5.

Figure 3:
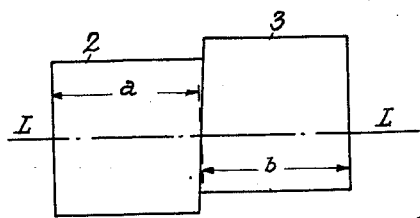

Fig. 3 shows the manner in which, by displacement of the crystal 2 in relation to the crystal 3, the path of the ray of light L, with wedge-shaped embodiment by reason of the obliquely ground ends of the crystal, is varied within the single crystals with their axes of symmetry turned towards each other. In accordance with the adjustment, the path $a$ in the crystal 2 may be made greater or smaller than the path $b$ in the crystal 3, thus providing the possibility of regulating the degree of compensation.

Figure 4:
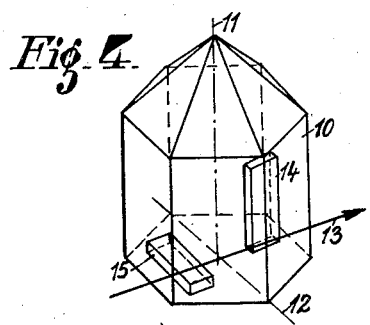
Figs. 4 and 5 show a view and plan view of a quartz crystal, having the crystal leaves which, in accordance with the invention, are cut out.
Figure 6:
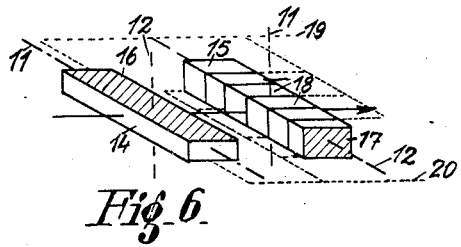
Fig. 6 shows an arrangement of the crystals with the axes.
Figure 5:
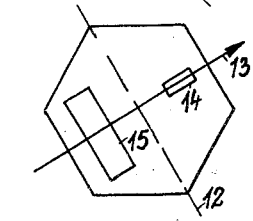
Figure 7:
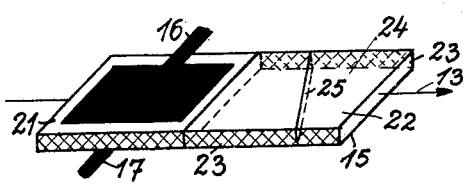
Fig. 7 shows a modified arrangement of the crystals.

The quartz belongs to the trigonal system and the group of enantiomorphian hemihedrism. In Fig. 4 there is shown the principal form 10 of a crystal of this nature, in which the optical axis 11 (shown in a broken line) extends vertically, whilst the polar electrical axes 12 extend horizontally from the edges of the block to the ones opposite; the three electrical axes thus resulting are equivalent to each other. The direction of the light, in which the quartz in accordance with the invention is traversed, is indicated by the thick arrow 13, which is vertical to the optical axis 11 and to one of the electrical axes 12. The quartz plates 14 and 15 employed for the invention are cut from the quartz in such fashion that the passage of the light in the direction 13 takes place vertically to the electrical field. From this requirement there results the provision of the potential-supply coatings 16 and 17 for producing the electrical field, as illustrated in Figs. 6 and 7. The cut-out crystal 14 is furnished with the coating on the broad sides, so that the field runs in the direction of the electrical axis 12 indicated by a broken line. In the case of the compensating crystal 15 the electrical axis 12 must be disposed vertically to that in the crystal 14, and the coatings 17 accordingly require to be provided on the narrow sides, or they are located after division of the member 15 in each case in the interstices between the small plates 18 thus formed. In connection with this divisioning it should be observed that the direction of the field coincides with the direction of the polar electrical axis. The single consecutive plates, therefore, require to be rotated on each occasion by 180° about the axis of the light direction. The coatings 16 and 17 are connected alternately with the potential poles 19 and 20, with which there may also be connected the members 16 and 17 of the first crystal 14.

In the arrangement according to Fig. 7 merely the first crystal 21 is controlled, whilst the crystal 22 is included solely in the capacity of compensation crystal not connected in an electrical field. The edges 23 and/or faces 24 of the crystals disposed parallel to the path of light 13 are opaque or blackened in order to avoid reflection of the light. The crystal 22 may be divided along the edge 25, so that the path of light in the crystal 22 may be varied by displacing the part crystals against each other.

The adjustment of the compensating action, by means of which there is selected the zero point of the characteristic, may, in place of the sloping of the contacting edges shown in Fig. 7 in conjunction with the parallel displacement, also be performed by making the two crystals together rotary in relation to the direction of the light, whereby regulation or adjustment is also possible.

In the arrangement according to Fig. 8 the controlled crystal 21 between the contact faces 16 and 17 and the compensating crystal 22 are arranged one behind the other between the Nicol elements 26 and 27 in the passage of the rays of light which, proceeding from a light source 28, are projected through condenser lenses 29 and an image lens 30 on to a film 31. The crystal 22 is so much thicker than the crystal 21 that the rays indicated in broken lines and diverged to the greatest extent within the narrow plate 21 are not intercepted at the edges of the crystal 22. The crystals are fitted between two blocks 32 composed of black glass, between which they are held with the assistance of soft or elastic intermediate layers 33, without the use of cement or the like.

Fig. 9 shows an arrangement in which in place of a compensating crystal composed of the same material there is employed a compensating crystal 34 of strongly double-refractive material (for example, lime-spar). In this connection it is possible to make the dimensions of the total aggregate so small that the rays proceeding from the source 28 and passing through the gap formed by the controlled crystal 21 exert without the interposition of a lens a greater lighting effect on the film 31 than if a lens were provided. The spacing between the light source 28 and the film 31, indicated in the drawings as approximately 80 mm. should be imagined as being increased approximately twenty times, and is, therefore, in practice shortened down to a total length of approximately 3–5 mm. For screening off ray divergences which may occur between the controlled crystal 21 and the film 31 there is employed a diaphragm 35 having a narrow slot 36, which should be located as far as possible immediately, i. e. at a distance of less than .5 mm., in front of the sensitized surface of the film 31.

Figs. 10 and 11 show an arrangement by means of which it may be accomplished that with the requisite small dimensions possible fluctuations in the thickness of the emulsion on the film are rendered ineffective, and the film may be moved in front of the slot 36 at the same minimum distance without rubbing. The film 31 is conducted over a drum 37 with the sensitized face inwards, within which drum there is located the entire quartz cell aggregate 38 with the slot 36 directed towards the film 31. Owing to the fact that the film, if necessary, is situated firmly on both sides against the surface of the drum 37, which in turn is guided in exactly central fashion by the shaft 39 in relation to the aggregate 38, there is ensured a constant spacing of the slot 36 with the least possible variations.

Figs. 12 and 13 show the use of similar drums for guiding the film in conjunction with an arrangement of the aggregate with lenses. The cell 40, which contains the total aggregate of the quartz, including the Nicol elements, is arranged outside of the plane of the film 31 together with the source of light 28. The rays of light passing the cell 40 are projected by means of the prisms 41 and 42 and through the image lens 30 on to the part of the film 31 intended for reception of the sound record.

In the arrangement according to Fig. 13 the prism 42 has been omitted owing to the fact that the light is conducted parallel to the shaft 39 of the drum 37.

The examples illustrated in the drawings are capable of being exchanged. Thus, for example, a lime-spar crystal may also be employed with an arrangement having a lens as compensating means, or the arrangement may also operate with similar crystals without an optic. The order of the crystals may also be changed about. The compensating crystal may be connected in front of or behind the controlled crystal in the path of the light. Since a quartz cell in any case allows the passage of ultra-violet rays, it may be of particular advantage to produce the lenses and other optical aggregates in the path of the light from quartz, so that the ultra-violet rays may be utilized for the recording, the intensity of the exposure thus being enhanced.

The invention, instead of being employed with quartz crystals, may also be used with other desired piezo-electrically effective crystals of suitable structure.

I claim:

1. A piezo-electric crystal arrangement for light intensity control purposes comprising a source emitting a light bundle of constant intensity, a first Nicol element acting as a polarizer, a first piezo-electric crystal element, a second piezo-electric crystal element, a second Nicol element acting as an analyzer, said bundle light emanating from said source traversing said elements one after the other, a pair of electrodes applied to said first crystal, a source of control potential connected to said electrodes in such fashion, that the electrical field is applied to said first crystal element in the direction of one of the electrical axes of said crystal element, said bundle of light traversing said first piezo-electric crystal element in a direction perpendicular to the optical axis and vertical to one of the electrical axes coinciding with the direction of the electrical field between said electrodes, said bundle of light traversing said second piezo-electric crystal element in a direction perpendicular to the optical axis and vertical to one of the electrical axes, said second crystal element being turned with respect to the optical axes at an agle of 90° against said first crystal element as to effect a compensation of the double refraction of said first crystal element.

2. A piezo-electric crystal arrangement for light intensity control purposes comprising a source emitting a light bundle of constant intensity, a first Nicol element acting as a polarizer, a first piezo-electric crystal element, a second piezo-electric crystal element, a second Nicol element acting as an analyzer, said bundle light emanating from said source traversing said elements one after the other, a pair of electrodes applied to said first crystal, a second pair of electrodes applied to said second crystal element, a source of control potential connected to said pairs of electrodes in such fashion that the electrical field is applied to said crystal elements in the direction of one of the electrical axes of said crystal elements, said bundle of light traversing said first piezo-electric crystal element in a direction perpendicular to the optical axis and vertical to one of the electrical axes coinciding with the direction of the electrical field between said electrodes, said bundle of light traversing said second piezo-electric crystal element in a direction perpendicular to the optical axis and vertical to one of the electrical axes, coinciding with the direction of the electrical field between said electrodes of said second crystal element, said second crystal element being turned with respect to the optical axes at an angle of 90° against said first crystal element as to effect a compensation of the double refraction of said first crystal element.

3. A piezo-electric crystal arrangement for light intensity control purposes comprising a source emitting a light bundle of constant intensity, a first Nicol element acting as a polarizer, a first piezo-electric crystal element, a second piezo-electric crystal element, a second Nicol element acting as an analyzer, said bundle light emanating from said source traversing said elements one after the other, a pair of electrodes applied to said first crystal, a second pair of electrodes applied to said second crystal element, a source of control potential connected to said pairs of electrodes in such fashion that the electrical field is applied to said crystal elements in the direction of one of the electrical axes of said crystal elements, said bundle of light traversing said first piezo-electric crystal element in a direction perpendicular to the optical axis and vertical to one of the electrical axes coinciding with the direction of the electrical field between said electrodes, said bundle of light traversing said second piezo-electric crystal element in a direction perpendicular to the optical axis and vertical to one of the electrical axes coinciding with the direction of the electrical field between said electrodes, said bundle of light traversing said second piezo-electric crystal element in a direction perpendicular to the optical axis and vertical to one of the electrical axes, said second crystal element being turned with respect to the optical axes at an angle of 90° against said first crystal element as to effect a compensation of the double refraction of said first crystal element, both said crystal elements being cut from the same original piece of material.

4. A piezo-electric crystal arrangement for light intensity control purposes comprising a source emitting a light bundle for constant intensity, a first Nicol element acting as a polarizer, a first piezo-electric crystal element, a second piezo-electric crystal element, a second Nicol element acting as an analyzer, said bundle of light emanating from said source traversing said elements one after the other, both said crystal elements being subdivided into thin layers by sections normal to one of the electrical axes, said layers being so arranged that in each of them said electrical axis has an orientation opposite to that in the next layer, metal foils separating of said layers every two neighbouring ones belonging to the same crystal, means to electrically connect in each of said crystal elements each of said foils to the next but one, in each of said crystal elements said foils thus forming two sets, a source of control potential having one of its poles connected to one of said sets of each of said crystal elements, and its other pole to the two remaining ones of said sets, said bundle of light traversing said first piezo-electric crystal element in a direction perpendicular to the optical axis and vertical to those of the electrical axes of said layers coinciding with the direction of the electrical fields between said foils, said bundle of light traversing said second piezo-electric crystal element in a direction perpendicular to the optical axis and vertical to those of the electrical axes of said layers coinciding with the direction of the electrical field between said foils, said second crystal element being turned with respect to the optical axes at an angle of 90° against said first crystal element as to effect a compensation of the double refraction of said first crystal element, the surfaces of the crystal elements traversed by said bundle of light being parallel to the plane determined by the directions of the optical axes and those electrical axes coinciding with the directions of the electrical fields between said foils.

5. A piezo-electric crystal arrangement for light intensity control purposes comprising a source emitting a light bundle of constant intensity, a first Nicol element acting as a polarizer, a first piezo-electric crystal element, a second piezo-electric crystal element, a second Nicol element acting as an analyzer, said bundle of light emanating from said source, traversing said elements one after the other, both said crystal elements being subdivided into thin layers by sections normal to one of the electrical axes, said layers being so arranged that in each of them said electrical axis has an orientation opposite to that in the next layer, metal foils separating of said layers every two neighbouring ones belonging to the same crystal, means to electrically connect in each of said crystal elements each of said foils to the next but one, in each of said crystal elements said foils thus forming two sets, a source of control potential having one of its poles connected to one of said sets of each of said crystal elements, and its other pole to the two remaining ones of said sets, each of said layers being in turn subdivided into parts, the size of said parts being determined by the natural frequency desired for the particular purpose said crystal arrangement is intended for, said bundle of light traversing said first piezo-electric crystal element in a direction perpendicular to the optical axis and vertical to those of the electrical axes of said layers coinciding with the direction of the electrical fields between said foils, said bundle of light traversing said second piezo-electric crystal element in a direction perpendicular to the optical axis and vertical to those of the electrical axes of said layers coinciding with the direction of the electrical field between said foils, said second crystal element being turned with respect to the optical axes at an angle of 90° against said first crystal element as to effect a compensation of the double refraction of said first crystal element, the surfaces of the crystal elements traversed by said bundle of light being parallel to the plane determined by the directions of the optical axes and those electrical axes coinciding with the directions of the electrical fields between said foils.

6. A piezo-electric crystal arrangement for light intensity control purposes comprising a source emitting a light bundle of constant intensity, a first Nicol element acting as a polarizer, a first piezo-electric crystal element, a second piezo-electric crystal element, a second Nicol element acting as an analyzer, said bundle of light emanating from said source traversing said elements one after the other, both said crystal elements being subdivided into thin layers by sections normal to one of the electrical axes, said layers being so arranged that in each of them said electrical axis has an orientation opposite to that in the next layer, metal foils separating of said layers every two neighbouring ones belonging to the same crystal, means to electrically connect in each of said crystal elements each of said foils to the next but one, in each of said crystal elements said foils thus forming two sets, a source of control potential having one of its poles connected to one of said sets of each of said crystal elements, and its other pole to the two remaining ones of said sets, said bundle of light traversing said first piezo-electric crystal element in a direction perpendicular to the optical axis and vertical to those of the electrical axes of said layers coinciding with the direction of the electrical fields between said foils, said bundle of light traversing said second piezo-electric crystal element in a direction perpendicular to the optical axis and vertical to those of the electrical axes of said layers coinciding with the direction of the electrical fields between said foils, said second crystal element being turned with respect to the optical axes at an angle of 90° against said first crystal element as to effect a compensation of the double refraction of said first crystal element, the surfaces of the crystal elements traversed by said bundle of light being parallel to the plane determined by the directions of the optical axes and those electrical axes coinciding with the directions of the electrical fields between said foils, those lateral faces of said crystal elements lying in parallel to the direction of said bundle of light being blackened.

7. A piezo-electric crystal arrangement for light intensity control purposes comprising a source emitting a light bundle of constant intensity, a first Nicol element acting as a polarizer, a first piezo-electric crystal element, a second piezo-electric crystal element, a second Nicol element acting as an analyzer, said bundle of light emanating from said source traversing said elements one after the other, both said crystal elements being subdivided into thin layers by sections normal to one of the electrical axes, said layers being so arranged that in each of them said electrical axis has an orientation opposite to that in the next layer, metal foils separating of said layers every two neighbouring ones belonging to the same crystal, means to electrically connect in each of said crystal elements each of said foils to the next but one, in each of said crystal elements said foils thus forming two sets, a source of control potential having one of its poles connected to one of said sets of each of said crystal elements, and its other pole to the two remaining ones of said sets, said bundle of light traversing said first piezo electric crystal element in a direction perpendicular to the optical axis and vertical to those of the electrical axes of said layers coinciding with the direction of the electrical fields between said foils, said bundle of light traversing said second piezo-electric crystal element in a direction perpendicular to the optical axis and vertical to those of the electrical axes of said layers coinciding with the direction of the electrical field between said foils, said second crystal element being turned with respect to the optical axes at an angle of 90° against said first crystal element as to effect a compensation of the double refraction of said first crystal element, the surfaces of the crystal elements traversed by said bundle of light being parallel to the plane determined by the directions of the optical axes and those electrical axes coinciding with the directions of the electrical fields between said foils, means to support both said crystal elements, said layers being kept in a definite position with regard to each other and to said supporting means by loose application under a constant weight without the use of any adhesive means.

8. A piezo-electric crystal arrangement for light intensity control purposes comprising a source emitting a light bundle of constant intensity consisting substantially of ultra-violet rays, a first Nicol element acting as a polarizer, a first piezo-electric crystal element, a second piezo-electric crystal element, a second Nicol element acting as an analyzer, said bundle of light emanating from said source traversing said elements one after the other, both said crystal elements being subdivided into thin layers by sections normal to one of the electrical axes, said layers being so arranged that in each of them said electrical axis has an orientation opposite to that in the next layer, metal foils separating of said layers every two neighbouring ones belonging to the same crystal, means to electrically connect in each of said crystal elements each of said foils to the next but one, in each of said crystal elements said foils thus forming two sets, a source of control potential having one of its poles connected to one of said sets of each of said crystal elements, and its other pole to the two remaining ones of said sets, said bundle of light traversing said first piezo electric crystal element in a direction perpendicular to the optical axis and vertical to those of the electrical axes of said layers coinciding with the direction of the electrical fields between said foils, said bundle of light traversing said second piezo-electric crystal element in a direction perpendicular to the optical axis and vertical to those of the electrical axes of said layers coinciding with the direction of the electrical field between said foils, said second crystal element being turned with respect to the optical axes at an angle of 90° against said first crystal element as to effect a compensation of the double refraction of said first crystal element, the surfaces of the crystal elements traversed by said bundle of light being parallel to the plane determined by the directions of the optical axes and those electrical axes coinciding with the directions of the electrical fields between said foils, said arrangement furthermore comprising lenses, all provided in the path of said B. C. light, all parts of said arrangement traversed by said bundle of light consisting of a material which allows the passage of ultra-violet rays.

9. A piezo-electric crystal arrangement for light intensity control purposes comprising a source emitting a light bundle of constant intensity, a first Nicol element acting as a polarizer, a first piezo-electric crystal element, a second piezo-electric crystal element, a second Nicol element acting as an analyzer, said bundle of light emanating from said source traversing said elements one after the other, said elements being joined together to form a single, fixable optical system, both said crystal elements being subdivided into thin layers by sections normal to one of the electrical axes, said layers being so arranged that in each of them said electrical axis has an orientation opposite to that in the next layer, metal foils separating of said layers every two neighbouring ones belonging to the same crystal, means to electrically connect in each of said crystal elements each of said foils to the next but one, in each of said crystal elements said foils thus forming two sets, a source of control potential having one of its poles connected to one of said sets of each of said crystal elements, and its other pole to the two remaining ones of said sets, said bundle of light traversing said first piezo-electric crystal element in a direction perpendicular to the optical axis and vertical to those of the electrical axes of said layers coinciding with the direction of the electrical fields between said foils, said bundle of light traversing said second piezo-electric crystal element in a direction perpendicular to the optical axis and vertical to those of the electrical axes of said layers coinciding with the direction of the electrical field between said foils, said second crystal element being turned with respect to the optical axes at an angle of 90° against said first crystal element as to effect a compensation of the double refraction of said first crystal element, the surfaces of the crystal elements traversed by said bundle of light being parallel to the plane determined by the directions of the optical axes and those electrical axes coinciding with the directions of the electrical fields between said foils.

KURT KLINGSPORN.